United States Patent Office 3,238,192
Patented Mar. 1, 1966

3,238,192
PARCHMENT ION EXCHANGE REAGENTS
Edward L. Taylor, Allegan, Mich., assignor to KVP Sutherland Paper Company, Kalamazoo, Mich., a corporation of Delaware
No Drawing. Filed June 19, 1961, Ser. No. 117,831
22 Claims. (Cl. 260—215)

The present invention relates to new and improved ion exchange reagents and to the production thereof, and is especially concerned with parchment ion exchange reagents suitable for the percolation of aqueous solutions therethrough while maintaining high ion exchange rates and which are moreover desirably characterized by a low degree of swelling and by insolubility in aqueous media in which such ion exchange reagents are customarily employed.

Heretofore, it has been proposed to form ion exchange reagents by the treatment of fibrous cellulosic materials, such as cotton, wood cellulose, or the like, whether in discrete fibrous form or in the form of spun or water-laid sheets, such as cotton fabrics or paper. Although this has resulted in materials which possess a certain degree of ion exchange capacity, the physical form of such materials and their tendency to swell and mat in aqueous media has detracted from their usefulness in industrial applications, especially in fixed-bed ion exchangers. For example, it has already been proposed to form cellulosic ion exchange reagents through the phosphorylation or carboxymethylation of fibrous cellulose, e.g., by the treatment of cellulose fibers or cellulosic fibrous sheet materials with chloroacetic acid in the presence of alkalis. This has been attended with many difficulties for, as the degree of phosphorylation or etherification necessary to produce a sufficient degree of substitution to provide a desirable level of ion exchange capacity is approached, the swelling and solubility of the cellulose ion exchange product becomes too great to allow its use in aqueous solutions. Even at relatively low degrees of substitution, wet bulk and expansion prevents successful separation and regeneration operations required for economical use, especially in fixed-bed ion exchange operations. These inherent and characteristic disabilities of previously known cellulosic ion exchange reagents have greatly restricted their field of use, which has accordingly been limited to such applications as chromatography and like applications where their low capacity and especially their low flowthrough rates have not presented an undue time loss or other economic problem, and considerable research has been directed toward improvement of the ion exchange capacity and flowthrough rates of cellulosic ion exchangers while concurrently attempting to retain their chromatographic properties, with but little success before the present invention.

Parchment is a particular chemical product, a cellulose derivative commonly accepted as being a cellulose "hydrate," which in many ways retains the properties of cellulose although differing markedly from cellulose in various other properties. One aspect in which the properties of cellulose and parchment are alike is in their tendency to swell in the presence of water. In this respect parchment, which has a high wet strength, is more sensitive and subject to swelling than ordinary cellulose, this characteristic of parchment even making it possible to employ the same as a water-sensing medium in humidistats or hygrometers. From the standpoint of its tendency to swell in the presence of moisture or in aqueous medium, considering such as an established disadvantage of cellulose ion exchange reagents, it would hardly be supposed that parchment could be utilized in the preparation of more suitable ion exchange reagents, especially such as might be characterized by a high capacity and flowthrough rate and substantially diminished tendency to swell. The state of the art knowledge of the very considerable swelling tendencies of parchment would obviously discourage its consideration for ion exchange purposes, especially in view of the notorious shortcomings of other cellulosic ion exchange reagents in this regard.

Despite the experience of the prior art with regard to the disabilities of cellulose ion exchange reagents and the acknowledged similarity of parchment to ordinary cellulose insofar as swelling is concerned, it has now been found that parchment, i.e., parchmentized cellulose, in sheet, shred, scrap, fiber, or the floc form, may be treated with reagents to introduce a high percentage of ion exchange sites or groups into the parchment molecule and that the products thus produced have a high ion exchange capacity and flowthrough, are capable of ready reduction by friation to desirable particulate form, and are characterized by such a low degree of swelling and solubility in aqueous media that they can be successfully employed in fixed bed ion exchange columns, including the operations of rapid percolation, successive backwashing, and efficient reactivation, in either hydrogen or sodium cycle cation ion exchange reactions or in corresponding anion exchange reactions.

Parchment ion exchange reagents of the present invention have proved to be efficient ion exchangers in commercial type columns at relatively high flow rates as great as five gallons per minute per square foot or even higher without difficulty.

Due to their high efficiency, ability to be readily reduced to a desirable particulate form, and other advantageous characteristics, the parchment based ion exchange reagents of the present invention are especially suitable for the separation of many of the common metallic ions from aqueous solutions, such as thorium, uranium, uranium dioxide, ferric iron, calcium, cobalt, and so forth. They are moreover especially suitable for the separation of large cationic molecules, especially high molecular weight materials such as various proteins, enzymes, gamma globulins, toxins, haemoglobin, various $B_{12}$ vitamins, and even the aforesaid uranyl and thorium ions.

It is accordingly an object of the present invention to provide novel parchment ion exchange reagents and a method for their production. It is a further object to provide such reagents of high capacity which are in particulate form and which are characterized by substantial insolubility and substantial freedom from swelling in aqueous media, at least to an extent insufficient to detract from their usefulness in fixed bed or batch contact ion exchange processes, and a method for the production thereof. Another object of the invention is to provide such novel parchment ion exchange reagents which are readily adaptable to comminution (i.e., reduction in size) by friation to granular or flake material of predetermined particulate size, and in which friated state are compact, not subject to undue swelling, and have a high ion exchange capacity, as well as a process for the production thereof. Additional objects of the invention will be apparent to one skilled in the art and still other objects will become apparent hereinafter.

To obtain parchment, which term is herein employed synonymously with "parchmentized cellulose," I may use any conventional parchmentizing treatment of fibrous cellulosic sheet, scrap, fiber or floc materials with sulfuric acid, according to procedure which is well known in the art. Zinc chloride may also be used as the parchmentizing agent. Another new and useful method of parchmentizing is through the use of concentrated ortho-phosphoric acid. Still other parchmentizing methods are known in the art and may likewise be employed, although their commercial application has been quite limited to date.

The exact chemical nature of the chemical product known as parchment has not yet been determined, although parchment and the parchmentization of cellulose is an old art. As already stated, it is generally agreed, among those trained in the parchmentizing field, that parchment belongs to the class of compounds designated by the generic name of hydrated cellulose, and in many ways parchment is like cellulose and other hydrated celluloses. However, parchment is also essentially different when compared to cellulose and other types of hydrated cellulose.

Superficially in a physical sense, parchment resembles mercerized cellulose inasmuch as it retains its fiber structure and its X-ray diagram seems to show a distinctive diffraction pattern which, in effect, distinguishes hydrated cellulose from native cellulose. Parchment differs from mercerized cellulose, however, in that there is individual physico-chemical bonding, of a very specific nature, between most of the adjacent fibers, which is induced by the parchmentizing agent in the course of its production. The same or a similar bonding is completely lacking in both native and mercerized cellulose. The ordinary cellulose or mercerized cellulose bonding between fibers is usually considered to be limited to hydrogen bonding or van der Waal's forces, while parchment interfiber bonding is by primary covalent bonding between molecules.

In addition, parchment also differs from regenerated cellulose in that in parchment the original cellulose fiber structure is always identifiable even after strong parchmentizing. In regenerated cellulose, the original fiber structure is completely destroyed during the reaction and, upon once being precipitated in amorphous form, no natural fibers are ever again apparent.

The physical differences of parchment itself, due to the unique interfiber bonding of parchment, when compared to both ordinary cellulose and mercerized cellulose, involve characteristics which may carry over and be partly responsible for the distinctly different physico-chemical behavior of parchment ion exchange reagents.

Whatever the theoretical explanation might be, repeated experiments have shown that ion exchange reagents made from parchment surprisingly perform in an ideal manner and that the undesirable swelling which characterizes cellulose ion exchange reagents, and indeed parchment itself, does not carry over to parchment ion exchangers or hamper their efficient use with aqueous solutions. They apparently maintain a sufficiently fibrous form to allow ready accessibility to ion exchange sites, but yet appear to be sufficiently altered in processing so that, together with residual bonding between discrete fibers unrestricted or undue swelling of the reagent does not occur. Moreover, apparently due to the residual bonding by a natural cellulose derivative of the cellodextrin type which is commonly referred to in the parchment industry as "amylose," it has been found that the parchment ion exchange reagents can in fact be readily reduced to a chosen particulate size by friation in a mill or grinder, in contrast to ion exchange reagents produced from cellulose, in which case the particulate size is predeterminated by the dimensions of the individual fibers or floc, and which usually take the form of a fine powdery material which swells and compacts when used in fixed beds or even becomes gelatinous or soluble in batch contact operation. This phenomenon does not occur with the parchment ion exchange reagents of the invention.

The parchment ion exchange reagents of the invention may be readily comminuted by friation, as by fracturing, grinding, micronizing, or the like, into a discrete particulate form characteristically more porous than ordinary resins and thus also characterized by a much larger surface area. Their structure is open and porous so that large molecules and ions, not readily absorbed by ordinary resinous ion exchangers, can enter and become attached. The rate of ion exchange using the parchment ion exchange reagents of the invention is so very rapid that methods used to measure the exchange rates of the commercial resinous ion exchangers are not applicable.

My parchment ion exchangers thus retain all the advantages of cellulose ion exchangers, but substantially eliminate or at least greatly reduce the disadvantages of ordinary cellulose exchangers. My exchangers may be satisfactorily used in industrial ion exchange columns inasmuch as they can be readily made into particulates of any industrially desirable mesh size, which particulates have been found to maintain their individual integrity while also maintaining a fibrous form within the particulate.

Another advantage of my parchment ion exchangers is that it has been found possible to successively repeat the treatment for introduction of ion exchange sites into the parchment molecule without unduly increasing, the solubility of the fibers thereof. In case the treatment involved in the introduction of ion exchange sites into the parchment after original parchmentization of cellulose fibers, sheets, et cetera, is sufficiently severe as to produce a material which does swell excessively on contact with aqueous solutions, a second conventional parchmentizing treatment may even be employed *after* introduction of the ion exchange sites into the cellulose fiber molecule. However, it should be recognized that both the necessity and the desirability of such repeated treatments, whether for introduction of additional ion exchange sites for the purposes of reparchmentizing, is considerably dependent upon conditions of the initial parchmentizing treatment. Because of the laterally crosslinked cellulose fibers in parchment, it appears that the capacity of the parchment ion exchanger may be somewhat increased by the introduction of a larger number of ion exchange sites thereinto than previously possible in any cellulosic ion exchange product, without however, correspondingly increasing the risk of fiber solubility.

While concentrated ortho-phosphoric acid, having a concentration of eighty percent or more, ordinarily the usual eighty-five percent, is a preferred parchmentizing reagent for either the parchmentizing step or for reparchmentizing, other conventional parchmentizing reagents may be employed. This is also true when the procedure involves the introduction of ion exchange sites into a basic cellulose molecule and thereafter subjecting the ion exchange material to a parchmentization step (which may be done with facility according to conventional procedure or as herein given for parchmentizing or reparchmentizing, and especially in the manner of Example V), as well as when ion exchange sites are introduced directly into parchment and the material reparchmentized by subjecting the parchment ion exchange material to an additional parchmentization step. Whereas, for reparchmentizing or for parchmentization of cellulose exchangers, concentrated ortho-phosphoric acid appears to be the reagent of choice, other reagents, such as sulfuric acid or zinc chloride, may be used in any case, especially in the first parchmentization step to prepare the parchment material into which ion exchange sites are introduced, and as will be recognized the majority of parchment products today are still produced by the sulfuric acid process. The ortho-phosphoric acid parchmentizing process also lends itself well to a continuous process for production of parchment ion exchange materials, as will appear more fully hereinafter.

Thus, it has been found that parchment ion exchange materials having an ion exchange capacity from about .3 to three milliequivalents per gram are suitable and advantageous ion exchangers for various applications. Parchment ion exchange reagents having an ion exchange capacity within the range of about .4 to 2.7 milliequivalents per gram are preferred, and those having an ion exchange capacity of from about .6 to 2.5 milliequivalents per gram are most suitable for the majority of applications in which they are likely to be employed. However, it is pointed out that the ion exchange capacity may be as great as three milliequivalents per gram without corresponding cumulative disadvantageous results such as excessive swelling and solubility in aqueous media. The lower limit of about .3 appears to be the lowest ion exchange capacity at which a satisfactory ion exchange is obtained using the reagents of the invention.

My parchment ion exchange reagents are in general the cationic parchment phosphoric acid esters, parchment sulfuric acid esters, parchment carboxyalkylates, and parchment carboxyalkylacylates, including the alkali and alkaline earth metal salts thereof, and the anionic parchment aminoalkylates and parchment aminoalkylacylates. In the anionic exchangers, the amine radical may be primary, secondary, or tertiary. These products are all prepared in conventional manner known in the art for the preparation of cellulose phosphoric acid esters, sulfuric acid esters, carboxyalkylates, carboxyalkylacylates, aminoalkylates, and aminoalkylacylates. According to the present invention, upon their preparation, they are subjected to drying prior to comminution, when such is desired.

The extent to which the parchment ion exchange products of the present invention are dried deserves consideration. Whereas the physical strength of the parchment carboxyalkylates, carboxyalkylacylates, aminoalkylates, and aminoalkylacylates is such that friation can be effected satisfactorily after a short period of drying, and in some cases after very little drying, the strength of the parchment phosphoric acid esters and sulfuric acid esters is such that a period of cure is necessary to reduce their physical strength considerably before satisfactory friation can be effected. During this heating period, the phosphoric acid esterification reaction, and in some cases also the sulfuric acid esterification, continues, and is prerequisite to attainment of the desired degree of esterification. The exact period of time or temperature at which this cure is effected is immaterial, so long as destructive charring or burning does not result, so long as the desired degree of esterification is attained, and so long as the physical strength of the product is reduced to the point at which friation, when desired, can be effected. The tensile strength of the parchment phosphoric acid esters, representing a preferred embodiment of the invention, is usually reduced to zero or thereabouts, and the tensile strength of the other parchment ion exchange materials may be likewise reduced by heat or cure.

After drying, the products may be readily friated into a particulate of any desired particle size, usually to pass at least a 5 mesh and ordinarily to pass at least a 10 mesh screen. A size of the individual particles within the range of 20 to 200 mesh, usually 20 to 150 mesh, will ordinarily be most preferable in commercial operation. Within the limits of the particulate form of the ion exchange material, the cellulose fiber structure remains substantially intact.

When a very fine particulate form of fibrous nature, which does not swell excessively on contact with equaous media, is desired, I may parchmentize cellulose so as to obtain internal molecular bonding, but little interfiber bonding, as by parchmentizing fibers or flocs of cellulose, rather than sheets, to produce a "vulcanized" fiber, and then introducing ion exchange sites thereinto. For example, I may first parchmentize the floc, as with liquid ortho-phosphoric acid of parchmentizing strength, at least about 80 and usually about 85% concentration, dilute residual acid carried by said parchment product, as with water, to a lesser concentration, usually of about 20% or below, add nitrogenous base antitenderizing agent such as urea or others as mentioned herein, heat to produce the parchment phosphoric acid ester and preferably also to cure the same, as to the point of ready friability, and wash with non-ammonium electrolyte, thus to both parchmentize and introduce the ion exchange sites in a continuous process. This same parchmentizing procedure may be employed using cellulose sheet or scrap materials, e.g., as a part of a continuous procedure in which a sheet or web of waterleaf or other paper is both parchmentized and ion exchange sites introduced thereinto, or using an existing cellulose ion exchanger.

The introduction of ion exchange sites into the parchment molecule, according to conventional procedure previously applied to cellulose, employs etherifying agents or esterifying agents, in particular carboxyalkylating agents, carboxyalkylacylating agents, phosphoric acid esterifying agents, sulfuric acid esterifying agents, aminoalkylating agents, or aminoalkylacylating agents, which are respectively suitable to introduce the carboxyalkyl, carboxyalkylacyl, phosphoric acid ester, sulfuric acid ester, aminoalkyl, and aminoalkylacyl groups. In the production of parchment ion exchange reagents by the introduction of ion exchange sites thereinto, it is only necessary that the etherification or esterification reaction be conducted so as to produce the desired degree of ion exchange capacity, as determined in accord with the methods and general procedure found on pages 51 and 52 of the manual entitled "Dowex: Ion Exchange" published by the Lakeside Press, Chicago, Illinois, or in accord with the method of Jurgens et al., Textile Research Journal 18, 42 (1948). After preparation of the parchment ion exchange material by introduction of the ion exchange sites thereinto through employment of an esterifying or etherifying agent, the material may be subjected to drying, and may be washed with water and distilled water, and recycled with various electrolytes of acidic nature, e.g., hydrochloric acid, or basic nature, for example, sodium or potassium hydroxide, sodium carbonate, or sodium chloride, or like acidic or basic materials such as other acids or alkali metal or alkaline earth metal bases, e.g., calcium chloride, in accord with standard procedure involving ion exchange reagents. Since the presence of ammonium ions is undesirable from the standpoint of an effective ion exchange reagent, it is desirable to remove to the fullest extent possible any ammonium ions which may be present, especially in such cases where a nitrogenous base antitenderizing agent is employed, as with phosphoric acid or some sulfuric acid esterifying procedures. To this end as well as for the removal of excess acid, the parchment phosphoric acid ester product and the sulfuric acid ester product, when made using a nitrogenous base antitenderizing agent, are washed with dilute caustic, i.e., alkali or alkaline earth metal base, such as sodium carbonate, either before or after drying of the parchment ion exchange material, but at any rate after completion of the esterification reaction and preferably after drying so as to allow the period of the heating or cure to eliminate as much as possible of the nitrogen content, which also has the effect of reducing physical strength materially. Acid wash, as with hydrochloric acid or ortho-phosphoric acid, may also be employed if desired. After washing of such nitrogen-containing materials with any non-ammonium electrolyte, but usually with a suitable acid or alkali metal or alkaline earth metal base, preferably sodium carbonate followed by water or acid, the phosphoric acid ester parchment ion exchange reagents contain a maximum of one percent combined nitrogen by weight and have a weight ratio of phosphorous to nitrogen of at least four to one, and the parchment sulfuric acid esters likewise contain a maximum of one percent combined nitrogen by weight and have a weight ratio of sulphur to nitrogen of at least four to one. At this maximum nitrogen content and such ratios, the phosphoric acid esters and sulphuric acid esters are effective ion exchange reagents, especially upon comminution, having high stability and storage capacity, especially in the sodium cycle form.

In carrying out the ion exchange site introduction according to conventional procedure of the art for introduction of ion exchange sites into cellulose, the parchment may first be converted to an alkali metal parchmentate, e.g., sodium parchmentate, and thereupon reacted with an alpha-halo organic acid which may be classified as a carboxy-alpha-alkylhalide or an alpha-halo-lower aliphatic acid, together with a suitable acid binding agent. In such procedure, the carboxy-alpha-alkylhalide is preferably first contacted with the parchment, as by spraying onto a moving parchment web or by submerging the parchment therein, and the thus-wetted parchment thereupon exposed to a bath of the selected alkali metal base. A molar ratio of water to parchment from about .5 to three or greater or lesser ratios, an excess of the sodium hydroxide and the carboxy-alpha-alkylhalide to the parchment, and a reaction temperature between about ten and thirty degrees centigrade, together with reaction periods from one to twelve hours are ordinarily suitable to effect the desired degree of substitution or introduction of the desired number of ion exchange sites, although a reaction time in excess of one hour appears to have limited effect at or about ordinary temperatures and usual ratios of reactants. A substantial excess of sodium hydroxide and carboxy-alpha-alkylhalide is ordinarily employed. The product may then be neutralized with acid, washed with water, dried, and comminuted into any suitable particle size if desired, or subjected to a reparchmentization procedure as shown in Example V. The parchment ion exchange product is converted to the desired hydrogen or other cycle ion exchange material by contacting with dilute alkali or alkaline earth metal base or with dilute acid in the usual manner. The acid may have a widely varying concentration, even up to 85% ortho-phosphoric acid in the case of reparchmentizing, and the concentration of the base may also be widely varied. Ordinarily the acid or base has a concentration not exceeding 25% by weight and is preferably much weaker.

As an alternative, to produce anionic exchange materials, amino-alpha-alkylhalides may be employed in the etherification reaction, or aminoalkyl sulphates or aminoalkyl sulfonates may be employed, generally in accord with the same procedure and as further exemplified by the examples. Other etherifying agents which may be employed include the hydrogen sulphates such as aminoalkyl hydrogen sulphates, which are reacted together with the alkali metal parchmentate in usual manner and as further illustrated by the examples.

The esterification procedures employed to produce parchment ion exchange esters are conventional in the prior art for the esterification of cellulose and involve the reaction of a dibasic acid or amino acid, preferably in the presence of pyridine or other amine or similar basic solvents, heating the reaction mixture, preferably under reflux, and washing, drying, and preferably comminuting the parchment ion exchange material thus produced to the desired particle size. An excess of the esterifying agent is ordinarily employed in the reaction, such procedure is productive of the products referred to herein as parchment carboxyalkylacylates which, as will be apparent, can be recycled with either acid or basic electrolyte to produce the desired ion exchange reagent operating on the selected cycle.

When phosphoric acid esterifying agents or sulfuric acid esterifying agents are employed to introduce ion exchange sites into the parchment molecule, this again is carried out according to procedure conventional in the art for the treatment of ordinary cellulose. The phosphoric acid esterifying agent or the sulfuric acid esterifying agent is ordinarily employed by contacting the parchment therewith as by spraying onto a moving parchment web or by submerging the parchment therein for a limited period, removing excess reagent, heating, acidifying or neutralizing and acidifying, washing, drying and curing to substantially eliminate residual strength, and friating to the desired particle size. The product at this stage is in the hydrogen form but may be converted to the sodium or other cycle in the usual manner. This is also accomplished before or after drying, preferably after curing, by the neutralization of residual acid employing a dilute base such as sodium carbonate. When a phosphoric acid esterifying agent is employed, it is also necessary to employ a nitrogenous base antitenderizing agent such as urea or a tertiary amine such as pyridine to prevent hydrolysis of the parchment molecule. The same is true of most sulfuric acid esterifying procedures.

In the practice of the procedure of the invention, drying or curing at a temperature of about 150–160° centigrade for a period of at least one hour, ordinarily about one to two hours, is usually sufficient, especially for the parchment phosphoric acid ester exchangers, although considerably shorter periods and lower temperatures may be employed for other parchment ion exchangers. As previously stated, the exact temperature of drying or curing and the exact period of drying or curing is immaterial, so long as the drying or curing is at a sufficient temperature and for a sufficient period of time to allow completion of the reaction and friation of the parchment ion exchange material into discrete particles, when desired. Although the drying or curing may be effected within considerably broader ranges, for all practical purposes, a temperature of at least about 138° certigrade is therefore ordinarily most efficient.

A highly advantageous procedure for preparing parchment ion exchange reagents of the present invention involves the treatment of parchment with ortho-phosphoric acid to introduce phosphoric ester groups thereinto. These ion exchange reagents are highly advantageous and have a desirable high capacity and an ideal physical form when prepared according to the present invention, partially due to the fact that upon the parchment esterification at least one residual acidic hydroxy group remains in each phosphoric ester group. In preparing such parchment phosphoric esters, as previously stated, it is necessary to employ a nitrogenous base antitenderizing agent, according to the conventional use thereof in the prior art to prevent the hydrolysis of cellulose, for the reason or purpose of preventing hydrolysis of the parchment molecule. The acid is ordinarily employed in a concentration of about twenty percent (20%) or less but can be used in concentrations up to a maximum of about seventy percent (70%), and the molar ratio of nitrogenous base antitenderizing agent, e.g., urea, to the acid is usually between about 1.5 and ten to one, preferably between about 1.8 and five to one.

Such nitrogenous base antitenderizing agent is preferably urea but may also be other organic basic materials such as piperidine, melamine, formamide, guanidine, biuret, acetamide, semicarbazide, cyanamide, dicyanamide, or the like, although urea is much preferred for prevention of undue tenderizing or depolymerization of the molecule. The urea or other antitenderizing agent, while apparently entering into the reaction, does not appear combined with the parchment in the final product in accord with the procedure of the present invention, and it is desirable that it not be present therein to any substantial extent. Whereas, in the treatment of cellulose materials for flameproofing it may be desirable to have the product contain a substantial amount of combined urea or other nitrogen, according to the present invention it is desirable to have a minimum of nitrogen and a maximum of phosphoric acid groups up to an ion exchange capacity of about three milliequivalents per gram of the parchment ion exchange material. The cation exchange reagents of the present invention in the hydrogen, sodium or other alkali or alkaline earth metal form contain a maximum of one percent combined nitrogen by weight and have a ratio of phosphorous to nitrogen by weight which is at least four to one. This will readily be understood when it is considered that the ammonium ions which may be present at the completion of the reaction due to the presence of the nitrogenous base antitenderizing agent are substantially eliminated either upon neutralization with dilute base, or upon circulating with an acid such as hydrogen chloride or a base such as sodium hydroxide or other acidic or basic electrolyte. Sodium chloride or other electrolyte solution may also be used, so long as the electrolyte is not an ammonium compound. Acids and bases are preferred. Thus it is apparent that, in their ion exchange form in either the hydrogen or sodium cycle, the parchment phosphoric ester ion exchangers of the present invention will contain less than one percent combined nitrogen by weight and have a weight ratio of phosphorous to nitrogen of at least four to one and, because of their very considerable ion exchange capacity and other desirable and advantageous characteristics, such parchment phosphoric acid ester ion exchange reagents constitute a preferred embodiment of the present invention.

The following examples are given by way of illustration only and are not to be construed as limiting.

Examples I and II set forth the method of treatment and character of the reagents obtained when treating parchment with phosphoric acids, and are meant to be illustrative and not limitative, as it is understood that the same or similar results may be obtained by employing other phosphoric acid esterifying agents.

EXAMPLE I

A water solution containing fifty percent urea and eighteen percent of 85% ortho-phosphoric acid by weight was sprayed onto a moving parchment web. The excess was then squeezed off between rubber squeeze rolls. The parchment was then dried at 150° centigrade for 1.5 hours. The resultant product was washed with cold water, hot water, two portions of ten percent sodium carbonate, and then with cold water again. The parchment was then air dried and ground into a particulate size so that it passed through a thirty mesh screen but was retained on a forty mesh screen. The product contained less than one percent combined nitrogen and a ratio of phosphorus to nitrogen by weight in excess of 4 to 1.

Five grams of the parchment ion exchanger, prepared in the above manner, were compared to five grams of a cellulose exchanger made from waterleaf paper (which constituted the pre-parchmentizing raw stock) in the identical manner. The cellulose exchanger could not be ground into a particulate of definite mesh size since it was of fibrous form.

When wetted with water and placed in a glass percolation column, the cellulose ion exchanger in the hydrogen form, weighing 5.00 grams air dry, occupied a volume of 44 ccs. with a six cc. static head above the top of the cellulose. Five grams of the parchment ion exchanger, also in the hydrogen form, occupied a volume of twenty ccs. with a six cc. static head of water.

Using a constant head of six ccs., 5.00 grams of the cellulose ion exchanger, occupying a volume of 44 ccs., had a water flow rate of 1.7 ccs. per minute. Five grams of the parchment ion exchanger, mesh range thirty to forty, in the hydrogen form and occupying a volume of twenty ccs., had a water flow rate of 15.5 ccs. per minute with a constant head of six ccs.

It was impossible to backwash the cellulose ion exchanger in the normal manner, due to the fibrous form of the material. Contrary to experience with the cellulose ion exchanger, the parchment ion exchanger of particulate form backwashed very easily and in the normal manner.

The parchment ion exchange resin had a capacity of 2.4 milliequivalents per gram of air dry reagent when tested with calcium ions according to the methods and general procedures as found on pages 51 and 52 of the manual entitled "Dowex: Ion Exchange," published by the Lakeside Press of Chicago, Ilonois.

*Tabular comparison of the ion exchangers of Example I*

| Parchment (particulate) | | Cellulose (fibrous) |
|---|---|---|
| 20 ccs | Original volume with/6 cc. static head | 44 ccs. |
| 15.5 cc./min | Maximum water flow rate | 1.7 cc./min. |
| Yes | Backwash | No. |
| 2.4 meq./g | Ion Exchange Capacity | Not measured—Plugged. |

EXAMPLE II

To a water solution containing 37% urea and 23% of 85% ortho-phosphoric acid by weight was added an appropriate amount of waste parchment trim. The parchment was allowed to remain in contact with the solution for one hour. The parchment was then removed and drained in such a manner that all excess liquor was removed from the surface of the parchment. The parchment was then dried for 1.2 hours at 160° centigrade. The resultant product was then washed with cold water, hot water, two portions of ten percent sodium carbonate, and then once more with cold water. It was then air dried and ground into a particulate size which passed through a thirty mesh screen but which was retained on a forty mesh screen, prior to evaluation. The product contained less than one percent combined nitrogen and a weight ratio of phosphorus to nitrogen of at least 4 to 1.

Five grams of the parchment ion exchanger, already in the H+ form, were introduced into a burette of one-half inch internal diameter and wetted with water. The parchment exchanger (mesh range 30–40) occupied a volume of 20.2 ccs. and had a maximum flow rate of 15.0 cc./min. with a constant static water head of six ccs.

The parchment ion exchanger was then sweetened on to a ten percent sodium chloride solution. At the breakthrough point, the resin occupied a volume of eighteen ccs. and had a maximum downflow of 12.7 cc./min. with a six cc. static head of ten percent sodium chloride.

The exchanger was then washed with water flowing in a downward direction. Maintaining a six cc. static head of water, the parchment ion exchanger occupied a volume of 21.0 ccs. and had a maximum flow rate of 9.0 cc./min. with a six cc. static head of water.

The resin was then backwashed with six times its own bed volume, i.e., 120 ccs., of water. With a six cc. static head of water, the parchment ion exchanger now occupied a volume of 24 ccs. and had a maximum flow rate of 18.0 cc./min.

The ion exchange capacity of the parchment ion exchange resin was 2.0 milliequivalents per gram of air dried product when tested as in Example I.

Using a cellulose ion exchanger made in the identical manner, but in the fibrous form (since it could not be ground into particulate form), the following procedure was followed: Five grams of the cellulose ion exchanger in the H+ form was wetted with water and placed into a burette of one-half inch internal diameter. The cellulose ion exchanger occupied a volume of 43.8 ccs. and had a maximum flow of 1.5 cc./min. with a six cc. static water head.

The cellulose resin was then sweetened on to a ten percent sodium chloride solution. At the breakthrough point, the cellulose resin occupied a volume of 28.8 ccs. and had a maximum flow rate of 0.4 cc./min. with a constant static sodium chloride head of six ccs.

The cellulose exchange resin was then sweetened on to water for a gravity wash. The cellulose exchanger swelled and occupied a volume of 33.0 cc. and had a maximum flow of 0.1 cc./min. with a static water head of six ccs.

The cellulose could not be backwashed in the tube. The cellulose fibers formed a cohesive mat and, in order to wash the cellulose ion exchanger, it had to be removed from the column and repeatedly slurried with wash water and filtered.

*Tabular comparison of ion exchange resins of Example II*

| Parchment (particulate) | | Cellulose (fibrous) |
|---|---|---|
| 20.2 ccs | Original volume with/6 cc. static head. | 43.8 ccs. |
| 15.0 cc./min | Maximum water flow rate | 1.5 cc./min. |
| 18 cc | Volume at breakthrough (NaCl soln.) with/6 cc. static head—volume. | 28.8 cc. |
| 12.7 cc./min | Maximum downflow at breakthrough (NaCl soln.). | 0.4 cc./min. |
| 21 cc | After H₂O gravity wash with/6 cc. static head—volume. | 33.0 cc. |
| 9.0 cc./min | Max. flow rate | 0.1 cc./min. |
| 24 cc | After backwash 6X vol. of H₂O with/6 cc. static head—volume. | Not Possible. |
| 18.0 cc./min | Maximum flow rate | Matted. |
| 2.0 meq./g | Capacity | Not Measured—Plugged. |

Other phosphorylating agents may also be employed in the manner of the preceding Examples I and II to produce phosphorylated parchment cation exchangers operating on either the hydrogen or the sodium cycle. Representative other acids which may be so employed are alkyl phosphoric acids, polyvinylphosphoric acid, toluene phosphoric acid, and the like. Moreover, meta-, pyro-, or hypophosphoric acids may also be present in the reaction mixture provided sufficient water is present for them to hydrolyze to the ortho form, or other methods of generating the ortho-phosphoric acid in situ may be used. The acid-ester products of this type of reaction between parchment and such phosphoric acid phosphorylating agent are herein generally referred to as parchment phosphoric acid esters, inasmuch as they are esters of the pendant hydroxy groups of the parchment chain with the acid, which retains its acidic nature through at least one and usually two acidic hydrogen atoms, thereby providing the requisite ion exchange site.

EXAMPLE III

In the same manner as given in Example II, parchment phosphoric acid ester ion exchange reagents are prepared by employing the following ratios of reactants:

(a)   100 parts of parchment
      180 parts of urea
      115 parts of 85% ortho-phosphoric acid
      200 parts of water The parchment was allowed to remain in contact with the aqueous solution until absorption of the solution by the parchment, whereafter the parchment was removed and drained in a manner such that all excess liquor was removed from the surface of the parchment. The parchment was then dried for a period of 1.0–1.2 hours at 160° centigrade and otherwise treated as in Example II.

(b)   100 parts of parchment
      216 parts of urea
      138 parts of 85% ortho-phosphoric acid
      240 parts of water The parchment was allowed to remain in contact with the aqueous solution until absorption ceased, whereafter the parchment was removed and drained in a manner such that all excess liquor was removed from the surface of the parchment. The parchment was then dried for a period of 1 to 2 hours at 160° centigrade and otherwise treated as in Example II.

(c)   100 parts of parchment
      270 parts of urea
      173 parts of 85% ortho-phosphoric acid
      417 parts of water The parchment was allowed to remain in contact with the aqueous solution until absorption ceased, whereafter the parchment was removed and drained in a manner such that all excess liquor was removed from the surface of the parchment. The parchment was then dried for a period of 1 to 2 hours at 160° centigrade and otherwise treated as in Example II.

In each of the above cases, the ion exchange reagent, both in the hydrogen and sodium form, was found to have a relatively high ion exchange capacity and flow-through rate and to be characterized by substantial insolubility and increased freedom from undesirable swelling and matting in aqueous media when compared with corresponding cellulose ion exchange reagents. The ion exchange capacity in each case was in the range .3 to three milliequivalents per gram.

As heretofore mentioned, ion exchange resins may also be prepared by treatment of parchment, e.g., parchmentized paper sheets, scrap, et cetera, with aminoacids or dicarboxylic acids, in accord with the following example.

EXAMPLE IV

To 300 milliliters of pyridine was added twenty parts of succinic acid anhydride and seven parts of air-dried parchment. The mixture was then heated under reflux conditions for 15.5 hours at 60° centigrade ±3° centigrade. The parchment-like product of this reaction was then washed in cold running water until free of reactants, dried at 110° centigrade for three hours, and friated in a grinder to a particulate size of ten mesh or smaller.

Using a 0.5 gram sample of the parchment succinate, 25 milliliters of 0.2 Normal sodium carbonate and 0.11 Normal hydrochloric acid, the parchment exchanger was evaluated by the batch method of Jurgens, Reid and Guthrie [Textile Research Journal 18, 42 (1948]. This test showed that the parchment succinate product had an ion exchange capacity of 1.4 meq./g., which contrasted favorably to the value of 0.6 meq./g. obtained in the same test for the closest comparable commercial cellulose exchanger which contained carboxy groups. The physical and ion exchange advantages found to be associated with the use of parchment as a starting material in Examples I and II were found to carry through to the succinate ester as well.

*Tabulation*

| Parchment succinate | | Commercial ion exchange resin containing COOH |
|---|---|---|
| 1.4 meq./g | Standard batch test-capacity | 0.6 meq./g. |

In the manner of the preceding example, parchment is reacted with other dibasic acids, such as phthalic, fumaric, oxalic, camphoric, maleic, malonic, glutaric, adipic, itaconic, suberic, maleic, or the like or with tribasic acids such as citric or even polybasic acids such as mellitic to obtain a high degree of esterification and to produce parchment ion exchange materials of high capacity from .3 to 3 milliequivalents per gram with the attendant advantages previously mentioned. These treatments are accomplished in the manner of Example IV by refluxing a solution of one or more of the named dibasic acids in pyridine or other basic solvent in contact with the parchment, washing, drying, and comminuting to the desired mesh size.

In this matter parchment phthalate, fumarate, maleate, malonate, glutarate, oxalate, camphorate, adipate, itaconate, suberate, malate, citrate or mellitate are prepared, having high ion exchange capacities. These products are generally referred to herein as parchment carboxyalkylacylates.

Also in the manner of the preceding example, parchment is treated with amino acids, such as carbamic acid, glycine, alpha-aminopropionic acid, alpha-aminobutyric acid, alpha-amino-beta-phenylpropionic acids, alphaaminosuccinic acid, alpha, epsilon-diaminocaproic acid, or alpha-amino-beta-imidazolepropionic acid, if desired using suitable inert solvents, e.g., hydrocarbons or chlorinated hydrocarbons, and/or other suitable catalyst; to produce parchment anion exchange materials of a relatively high capacity and advantages mentioned previously. Upon carrying out the reaction in the manner of the preceding example and then washing, drying, and comminuting to pass a 20 mesh screen, the anion exchangers, herein generally referred to as parchment aminoalkylacylates, having high anion exchange capacities and including for example parchment carbamate, parchment aminoacetate, parchment alpha-aminopropionate, parchment alpha-aminobutyrate, parchment alpha-amino-beta-phenylpropionate, parchment alpha-aminosuccinate, parchment alpha,epsilondiaminocaproate, parchment alpha-amino-beta-imidazolepropionate, and corresponding beta-amino and secondary and tertiary amino products are produced, starting from parchment and the appropriate aminoacid.

In addition to the formation of esters and partial esters, suitable ion exchange resins may be prepared by the etherification of parchmentized cellulose with halogenated carboxylic acids and other etherifying agents as shown in the following.

EXAMPLE V

A 50% water solution of chloracetic acid was sprayed onto a moving parchment web. The excess was then squeezed off and the web dried at 110° centigrade. The web was then exposed to a batch of 35% sodium hydroxide for approximately two hours. The sheet was neutralized in dilute acetic acid and then washed in water until neutral. The treated sheet was then dried and reparchmentized. In this case the reparchmentization was effected by submergingly exposing the treated sheet to a parchmentizing bath of 85% ortho-phosphoric acid for a period of about three seconds, washing, and drying. The thus treated and reparchmentized parchment was then dried and ground into particulate sizes, respectively to pass through a 20, 30, and 40 mesh screen.

Five grams of the carboxymethyl parchment ion exchanger, produced in the above manner, were compared to five grams of a cellulose exchanger also made from a waterleaf paper (from which the parchment was originally prepared) instead of parchment, in the same manner as above. However, the cellulose exchanger could not be made into a particulate of definite mesh size since it was of fibrous form.

When wetted with water and left standing in a glass percolation column for five days, the carboxymethyl cellulose occupied a volume of 9.0 cc. and had a maximum flow rate of 1.5 cc./min., with a six cc. static head. The carboxymethyl parchment product of 20 to 30 mesh, in the hydrogen form, wetted with water and left standing in a glass percolation column for five days, occupied a volume of 5.7 cc. and had a maximum flow rate of 8.6 cc./min. with a 6 cc. static head.

The carboxymethyl parchment product had an ion exchange capacity of 0.8 meq./g. of exchanger compared to to a capacity of 0.6 meq./g. for a commercial grade of carboxymethyl cellulose, when determined according to the published method used in Example IV.

*Tabulation*

| Parchment carboxymethylate (particlate) | | Carboxymethyl cellulose (fibrous) |
|---|---|---|
| 5.7 ccs | 5 day set, with/6 cc. static head—volume. | 9.0 ccs. |
| 8.6 cc./min | Flow rate | 1.5 cc./min. |
| 0.8 | Capacity, meq./g | 0.6 (commercial carboxymethyl cellulose exchanger). |

In the same manner as given in the foregoing example, other parchment ion exchange ethers are prepared by the reaction of parchment alkali metal or alkaline earth metal alcoholate, such as sodium, potassium, or calcium parchmentates, with alpha-halo organic acids such as monochloroacetic acid, monobromoacetic acid, alpha- or beta-chloropropionic acid, or like carboxy-alpha-alkylhalides (alpha-halo-lower-aliphatic acids), together with a suitable acid binding agent such as sodium hydroxide, sodium carbonate, quaternary ammonium hydroxides such as dibenzyl dimethyl ammonium hydroxide, or primary, secondary or tertiary amines, especially tertiary amines such as pyridine, or the like. The reaction for preparation of the carboxyalkyloxy parchment (or, parchment carboxyalkylate) ion exchange products is in all respects similar to conventional procedure for the preparation of cellulose ethers using an alcoholate, such as sodium cellulose, and a carboxy-alpha-alkylhalide, such as chloroacetic acid, to produce a carboxyalkyl cellulose, in the exemplary case carboxymethyl cellulose, with neutralization and washing to neutrality as indicated in Example V and with further exposure to an alkali metal or alkaline earth metal base for a limited period, as in Examples I or II, if a sodium or other cycle cation exchanger is desired. Drying and comminution may in all cases be effected in the usual manner, in accord with the foregoing examples.

EXAMPLE VI

Several grams of 27 pound parchment fragments were thoroughly wetted with a 10% solution of taurine (2-aminoethyl sulfonic acid) and then dried in an oven at eighty degrees centigrade for about 45 minutes. The thus-treated parchment fragments were then soaked in eighteen percent sodium hydroxide for one hour. Excess solution was then decanted from the fragments, which were washed and blotted until all surface moisture had been removed. The treated chips were then dried in the oven at 100° centigrade for one hour.

These fragments of aminoethyl parchment, upon friating to pass a 20 mesh screen, when tested in a batch process as an ion exchange reagent, had a capacity range of 0.6 meq./g. to 1.1 meq./g. and a high flowthrough rate. The material did not exhibit substantial tendency to swell in the aqueous solution employed in the ion exchange reaction.

In the same manner, other aminoalkyl ethers of parchment are produced from alkali metal parchmentates, including parchment aminoethylate, parchment dimethylaminoethylate, parchment diethylaminoethylate, and parchment diisopropylaminoethylate, which are respectively produced in the manner of the foregoing example from sodium parchmentate and aminoethyl sulfonic acid, dimethylaminoethyl sulfonic acid, diethylaminoethyl sulfonic acid, dimethylaminoethyl sulfonic acid, diethylaminoethyl sulfonic acid, and diisopropylaminoethyl sulfonic acid. Upon comminution to pass a twenty mesh screen, the materials are found to be effective anion exchange reagents.

EXAMPLE VII

In the manner given in Example V, parchment is treated with from .06 to .12 part of monochloroacetic acid per part of parchment, dried, and then exposed to a batch of sodium hydroxide. The sodium hydroxide concentration remains constant at about 34.8 to 34.9 percent.

The carboxymethyl parchment ion exchange reagent produced in this manner is found to be an effective ion exchange reagent and to have an ion exchange capacity in the range between .3 to 3 milliequivalents per gram after drying and friation to a particle size sufficiently small to pass through a 20 mesh screen.

EXAMPLE VIII

In the manner given in Example V, parchment is sprayed with .5 part of monochloroacetic acid per part of parchment and exposed to a bath of sodium hydroxide after removing excess monochloroacetic acid, washing, and drying. The sodium hydroxide solution is varied between about 10% and 38% concentration.

The product is thereafter dried and ground to a particle size sufficiently small to pass through a 20 mesh screen. The comminuted material is found to be an effective ion exchange reagent having an ion exchange capacity in the range between .3 and 3 milliequivalents per gram.

EXAMPLE IX

Twenty grams of parchment are treated with 80 grams of 20% sodium hydroxide solution. To the mixture is added 50 grams of 50% aqueous chloroethyldiisopropylamine solution. The mixture of reactants is thoroughly dispersed and heated at approximately 100° centigrade for a period of about an hour, whereafter it is washed and cycled with dilute acid and dilute alkali. It is finally washed free of excess electrolyte. After drying and pulverizing, the material is parchment diisopropylaminoethylate having an effective ion exchange capacity in the range of .3 to 3 milliequivalents per gram.

In the same manner, the corresponding parchment aminoalkylates are prepared by reacting parchment in the form of an alkali metal parchmentate with chloroethylamine, chloroethyldimethylamine, chloropropyldiethylamine, chloroethyldibutylamine, chloroethylpiperidine, and like primary, secondary, and tertiary amines having a terminal and preferably alpha halo atom on the alkyl group, and found to be effective anion exchange reagents.

EXAMPLE X

Ten parts of parchment in the form of a sheet is steeped in a solution of five grams of sodium hydroxide and ten grams of diethylaminoethyl hydrogen sulphate in nineteen grams of water and heated at a temperature of approximately 100° centigrade for one hour. The reaction product, consisting of diethylaminoethyl parchmentate (parchment diethylaminoethylate) is then washed and cycled with alkali, washed free of soluble electrolyte, and once more dried. After grinding to pass through a twenty-mesh screen, the material is found to be an effective ion exchange reagent having an ion exchange capacity in the range between .3 and 3 milliequivalents per gram.

In the same manner, other aminoalkyl ethers of parchment are produced from alkali metal parchmentates, including parchment aminoethylate, parchment dimethylaminoethylate, parchment diethylaminoethylate, and parchment diisopropylaminoethylate, which are respectively produced in the manner of the foregoing example from sodium parchmentate and aminoethyl hydrogen sulphate, dimethylaminoethyl hydrogen sulphate, diethylaminoethyl hydrogen sulphate, and diisopropylaminoethyl hydrogen sulphate. Upon comminution to pass a 20 mesh screen, the materials are found to be effective anion exchange reagents.

EXAMPLE XI

Four parts of parchment in the form of a sheet is first moistened with a solution of ten percent 2-aminoethylsulfuric acid in 25% sodium hydroxide. The sheet is then dried at a temperature of about 100° centigrade for a period of about one hour, washed in cold water, several times with distilled water, and then redried. Upon grinding into a particle size sufficiently small to pass through a twenty mesh screen, the product, parchment 2-aminoethylate, is found to be an effective ion exchange reagent having a capacity between .3 and 3 milliequivalents per gram.

Although solutions of about 10% 2-aminoethylsulfuric acid in 25% sodium hydroxide solution appear to represent highly useful concentrations, variations in these percentages may be employed. From about 15% to 40% solutions of sodium hydroxide are effective, as are such solutions containing as low as three percent or as high as fifteen percent 2-aminoethylsulfuric acid. Drying of the product for a period longer than forty minutes or at a temperature substantially in excess of 100° centigrade does not appear to be necessary, although heating periods as long as seventy hours at temperatures as low as about 70° centigrade and as high as 150° centigrade for shorter periods may be employed. As temperature is increased, the time should be reduced, and vice versa.

It is also possible to employ 2-aminoethylsulfuric acid generated in situ from ethanolamine and fuming sulphuric acid, with dilution with water and neutralization with strong sodium hydroxide.

EXAMPLE XII

Parchment is reacted by mixing with chlorosulfonic acid in the presence of pyridine at a temperature of 100° centigrade, removing excess reagents, washing with basic alcohol solution and drying to produce the sulfuric acid ester of parchment (parchment sulphate). Upon treatment with alcohol containing sodium hydroxide, sodium chloride, or other alkali metal or alkaline earth metal electrolyte, the corresponding alkali or alkaline earth metal salt is obtained. The product contains less than one percent combined nitrogen and a ratio of sulfur to nitrogen by weight of at least 4 to 1. After washing, drying, and grinding to pass a twenty mesh screen, the parchment sulphate product is found to be an effective ion exchange reagent having a capacity in the range between .3 and 2.25 milliequivalents per gram and to be insoluble in aqueous media. No substantial swelling of the material in aqueous solution is observed.

Various modifications may be made in the products and process of the present invention without departing from the spirit or scope thereof, and it is to be understood that the invention is limited only by the scope of the appended claims.

I claim:

1. A parchment material selected from the group consisting of: parchment carboxyalkylates, parchment carboxyalkylacylates, parchment phosphoric acid esters, parchment sulfuric acid esters, alkali and alkaline earth metal salts of the foregoing, parchment aminoalkylates and parchment aminoalkylacylates; having an ion exchange capacity of from about .3 to 3 milliequivalents per gram, readily friable when dry into discrete particulate form, and having, when phosphorous is present in the molecule, a weight ratio of phosphorus to nitrogen of at least about four to one and a maximum of about one percent combined nitrogen by weight and, when sulfur is present in the molecule, having a weight ratio of sulfur to nitrogen of at least about four to one and a maximum of about one percent combined nitrogen by weight.

2. A parchment ion exchange reagent according to claim 1 which is friated into a particulate form.

3. Parchment carboxyalkylacylate having an ion exchange capacity between about .3 and 3 milliequivalents per gram.

4. Parchment carboxyacetate having an ion exchange capacity between about .3 and 3 milliequivalents per gram.

5. A parchment ion exchange reagent selected from the group consisting of parchment carboxyalkylacylates and alkali and alkaline earth metal salts thereof, having an ion exchange capacity of from about .3 to 3 milliequivalents per gram, in a particulate form having particle dimensions sufficiently small to allow passage through a five mesh screen.

6. Parchment carboxyalkylate having an ion exchange capacity between about .3 and 3 milliequivalents per gram.

7. Parchment carboxymethylate having an ion exchange capacity between about .3 and 3 milliequivalents per gram.

8. A parchment material selected from the group consisting of parchment carboxyalkylates and alkali and alkaline earth metal salts thereof, having an ion exchange capacity of from about .3 to 3 milliequivalents per gram, in a particulate form having particle dimensions sufficiently small to allow passage through a five mesh screen.

9. A parchment ion exchange reagent selected from the group consisting of parchment phosphoric acid esters and alkali and alkaline earth metal salts thereof, having an ion exchange capacity of from about .3 to 3 milliequivalents per gram, readily friable when dry into discrete particulate form, and containing a maximum of about one percent combined nitrogen by weight and having a weight ratio of phosphorous to nitrogen of at least about four to one.

10. A parchment ion exchange reagent according to claim 9 friated into a particulate form having particle dimensions sufficiently small to allow passage through a five mesh screen.

11. Parchment aminoalkylate having an ion exchange capacity between about .3 and 3 milliequivalents per gram.

12. Parchment aminoethylate having an ion exchange capacity between about .3 and 3 milliequivalents per gram.

13. A parchment ion exchange reagent which is a parchment aminoalkylate having an ion exchange capacity of from about .3 to 3 milliequivalents per gram, in particulate form having particle dimensions sufficiently small to allow passage through a five mesh screen.

14. Parchment aminoalkylacylate having an ion exchange capacity between about .3 and 3 milliequivalents per gram.

15. Parchment aminoacetate having an ion exchange capacity between about .3 and 3 milliequivalents per gram.

16. A parchment ion exchange reagent which is a parchment aminoalkylacylate having an ion exchange capacity of from about .3 to 3 milliequivalents per gram, in particulate form having particle dimensions sufficiently small to allow passage through a five mesh screen.

17. The method of producing parchment ion exchange reagents which includes the steps of introducing ion exchange sites into parchment and then reparchmentizing by subjecting the parchment ion exchange material to an additional parchmentizing step.

18. The method according to claim 17, wherein the reparchmentizing step employs concentrated ortho-phosphoric acid as parchmentizing reagent.

19. The process according to claim 17, wherein the parchment ion exchange material subjected to reparchmentizing is a parchment carboxyalkylate.

20. The process according to claim 17, wherein the parchment ion exchange material is carboxymethyl parchment and wherein the reparchmentizing step employs approximately 85% ortho-phosphoric acid as the reparchmentizing reagent.

21. In a method for conducting ion exchange reactions in an aqueous medium involving the employment of an ion exchange reagent, the improvement which comprises the step of employing a parchment material as defined in claim 1 as the ion exchange reagent.

22. A continuous process for the production of a parchment ion exchange reagent, comprising the steps of subjecting cellulose to phosphoric acid of at least about eighty percent concentration to parchmentize said cellulose, diluting residual acid carried by the thus-produced parchment to a lesser concentration below about 70 percent concentration, bringing the acid-carrying parchment into contact with a nitrogenous base antitenderizing agent, heating the mixture of parchment, parchmentizing acid and nitrogenous base to produce phosphoric acid esterification of the parchment, and washing the product with a non-ammonium electrolyte solution.

References Cited by the Examiner

UNITED STATES PATENTS

| | | | |
|---|---|---|---|
| 2,087,609 | 7/1937 | Richter | 162—187 |
| 2,265,585 | 12/1941 | Urbain et al. | 8—120 |
| 3,024,207 | 3/1962 | Shaw et al. | 260—2.1 |

OTHER REFERENCES

Ind. and Eng. Chem., September 1952, pp. 2187–2189.

Guthrie et al.: Ion Exchange Celluloses for Chromatographic Separations, in Industrial and Eng. Chem., vol. 52, pp. 935–937, November 1960.

WILLIAM H. SHORT, *Primary Examiner.*

A. H. SUSKELSTEM, *Examiner.*